United States Patent [19]
Hartman et al.

[11] Patent Number: 5,962,602
[45] Date of Patent: *Oct. 5, 1999

[54] ULTRA-LOW VISCOSITY EPOXY SEALER/HEALER

[75] Inventors: Stuart J. Hartman, Livingston; Michael C. Coddington, Lebanon; David C. Elmendorf, Ringwood; Norman Blank, Wayne, all of N.J.

[73] Assignee: Sika Corporation USA, Lyndhurst, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/608,810

[22] Filed: Feb. 29, 1996

Related U.S. Application Data

[60] Provisional application No. 60/002,512, Aug. 18, 1995.

[51] Int. Cl.$^6$ ...................................................... C08L 61/00
[52] U.S. Cl. ........................... 525/504; 525/507; 525/523; 525/524; 528/93; 528/96; 528/111
[58] Field of Search ..................... 525/504, 507, 525/523, 524; 528/93, 96, 111

[56] References Cited

U.S. PATENT DOCUMENTS

| | | | |
|---|---|---|---|
| 4,086,309 | 4/1978 | Alberts | 264/35 |
| 4,110,313 | 8/1978 | Schulze et al. | 528/93 |
| 4,153,743 | 5/1979 | Caramanian | 427/136 |
| 4,269,879 | 5/1981 | Davis | 526/122 |
| 4,442,245 | 4/1984 | Weiss et al. | 523/426 |
| 4,977,214 | 12/1990 | Bagga | 528/93 |
| 5,567,748 | 10/1996 | Klein et al. | 528/111 |

OTHER PUBLICATIONS

Lee et al., Handbook of Epoxy Resins, 1983 Reissue, pp. 7–2 to 7–5, 7–19—7–22 and chpt 13, Jan. 1983.

*Primary Examiner*—Randy Gulakowski
*Attorney, Agent, or Firm*—Burns, Doane, Swecker & Mathis, L.L.P.

[57] ABSTRACT

An epoxy sealer/healer formulation for sealing and strengthening cracked concrete comprising an epoxy resin, an amine and a dialkylene triamine-alkylene oxide adduct, where the formulation provides a modulus and/or compressive strength at least that of uncracked concrete and effective for penetrating a concrete crack at a rate of at least 10 mm/min for a crack 0.5 mm wide when applied by gravity feed. The epoxy sealer/healer preferably has a viscosity of less than 100 centipoise and a tack-free time of less than 12 hours. The epoxy sealer/healer is advantageous in being able to bond to moist concrete surfaces. A method of using the epoxy sealer/healer for sealing and restoring the strength of cracked concrete is also set forth.

19 Claims, No Drawings

ULTRA-LOW VISCOSITY EPOXY SEALER/HEALER

This application claims the benefit of priority under 35 U.S.C. §119(e) of U.S. Provisional Application Ser. No. 60/002,512, filed Aug. 18, 1995.

BACKGROUND OF THE INVENTION

1. Field of the Invention

The present invention relates to an epoxy sealer/healer for sealing and strengthening cracked concrete.

2. Description of the Related Art

Concrete is used to make many structures, including bridges, roadways, tunnels, runways, parking ramps and decks, parapet walls, precast beams, columns, curbing, retaining walls and pavers. These structures commonly develop cracks upon exposure to the environment and to man-made activities. Thus, there is a widespread need for a composition for sealing and repairing cracked concrete structures.

Numerous compositions for sealing cracked concrete are known. One example is methacrylate-based formulations. These compositions suffer, however, from the disadvantages of being brittle, not useable under wet conditions, and generally slow curing. Another example is poly-siloxane-based resin formulations. These are not useable to seal visible cracks but, rather, are used as penetrants.

Epoxy-based compositions for sealing cracks in concrete are also known. A commercially available product called Denepox 40 is marketed by DeNeef America Inc. Denepox 40 is said to be a low viscosity, two-component epoxy resin system which can be applied to concrete cracks by pressure injection or by gravity feeding. Denepox 40 is a 100% solids resin said to be insensitive to the presence of water and useful for application to damp concrete surfaces. Denepox 40 is advertised as having a pot life of 80 minutes at 77° F., and a mixing viscosity of 40 centipoise at that temperature.

Versafill 60A/60B is a product made by Henkel Corporation and is a two-component epoxy system designed to penetrate and bond cracks in concrete structures. The material can either be injected or applied through gravity feed. Versafill 60A/60B is said to penetrate deeply into a crack (down to 4 thousandths of an inch in width), have little odor, and contain no solvents. The mixed two-component epoxy system is advertised as having a viscosity of 3.0–5.0 poise and a gel time of about 60 minutes.

Dural 335 is marketed by Tamms Industries and is characterized as a two-component, 100% solids, low viscosity epoxy resin for sealing concrete cracks and surfaces. Dural 335 is said to flow readily for deep penetration into cracks; the mixed formulation purportedly having a viscosity of 83 centipoise at 75° F., and a pot life of 40–50 min. Although the cured formulation is said to be moisture insensitive, surfaces and cracks must be completely dry before application of Dural 335 to obtain maximum penetration.

While epoxy-based formulations for sealing cracked concrete are known, they suffer from several disadvantages. Epoxy-based formulations usually have a high viscosity which, therefore, leads to poor crack penetration. Epoxy-based formulations also tend to have long tack-free times and some cannot bond to concrete and/or cure in the presence of water moisture. While some of those disadvantages have been overcome by products currently available, none of the products overcomes all of the disadvantages. The present invention provides a formulation which overcomes all of the aforementioned disadvantages.

OBJECTS AND SUMMARY OF THE INVENTION

It is a general object of the present invention to provide an improved epoxy composition for sealing and bonding cracked concrete, by both gravity feed and injection.

A more specific object of the present invention is to provide a low viscosity epoxy sealer/healer which substantially and deeply penetrates cracked concrete. Preferably, the present invention will provide an epoxy sealer/healer with structural repair properties when applied to cracked concrete, and which will bond to cracked concrete under moist conditions.

It is still a further object of the present invention to provide epoxy sealer/healers for use on cracked concrete having improved tack-free times. Preferably, the epoxy sealer/healer for cracked concrete will have a useable working life for most practical applications.

Accordingly, in one aspect the invention provides an epoxy sealer/healer for sealing and strengthening cracked concrete comprising an epoxy resin, an amine and a dialkylene triamine-alkylene oxide adduct, said formulation providing a modulus and/or compressive strength at least that of uncracked concrete while being effective for penetrating a concrete crack at a rate of at least 10 mm/min for a crack 0.5 mm wide when applied by gravity feed.

In another aspect, the invention provides an epoxy sealer/healer for sealing and strengthening cracked concrete comprising a wet surface-bonding, concrete crack self-penetrating formulation of an epoxy resin and amine, where the formulation has a tack-free time of 12 hours or less at 73° F.

In yet another aspect, the invention provides a self-penetrating epoxy sealer/healer for sealing and strengthening cracked, moist concrete comprising an epoxy resin, an amine and an dialkylene triamine-alkylene oxide adduct, where the formulation has a tack-free time of 6 hours or less at 73° F. and a viscosity of 100 centipoise (cps) or less at 73° F.

In still another aspect, the invention provides a method of sealing and restoring the strength of cracked concrete, comprising applying to a cracked concrete surface an epoxy sealer/healer comprising an epoxy resin, an amine and a dialkylene triamine-alkylene oxide adduct, where the formulation will provide a modulus and/or compressive strength at least that of uncracked concrete and will penetrate a concrete crack at a rate of at least 10 mm/min for a crack 0.5 mm wide when applied by gravity feed.

DETAILED DESCRIPTION OF THE INVENTION

As noted above, the present invention relates to an epoxy sealer/healer for sealing and strengthening cracked concrete. The epoxy sealer/healer can be characterized as a mixture of two parts, designated herein as Part A and Part B. Part A comprises an epoxy resin. Part B comprises an amine hardener and a dialkylene triamine-alkylene oxide adduct. Usually, Parts A and B each will further comprise one or more diluents. Typically, Part B will contain an accelerator. Part A may also contain an accelerator.

By sealer/healer as used herein, it is intended that such a composition will fill and seal cracks in concrete, thereby preventing water or other foreign matter from entering the concrete. In addition, the sealer/healer will bond to the inner surfaces of the crack thereby healing the concrete, i.e., increasing the modulus and/or compressive strength of the cracked concrete. An advantageous aspect of the invention is that the cured epoxy sealer/healer can increase the modulus and/or compressive strength of cracked concrete to at least that of uncracked concrete.

The epoxy resin contained in Part A is preferably a bisphenol A-epichlorohydrin resin, such as Araldite 6005 (marketed by Ciba-Geigy Corporation). However, other epoxy resins may also be used, including bisphenol F-epichlorohydrin resin, brominated epoxy resins and multifunctional resins such as a phenolic-epichlorohydrin resin. Part A will typically contain from 40–55% by weight of epoxy resin, and preferably contains from 46–50% by weight.

Part A can also contain a diluent in order to reduce viscosity. The diluent may be one component or, more often, is a mixture of components. Reactive diluents become part of the crosslinked polymer, and are preferred over non-reactive types because reactive diluents affect the properties of epoxy systems the least. Reactive diluents can contain various types of reactive functionalities. Preferred reactive diluents include difunctional epoxides and monofunctional epoxides.

More specifically, diluents according to the invention include, for example, diepoxides such as neopentyl glycol diglycidyl ether, 1,4-butanediol diglycidyl ether, resorcinol diglycidyl ether and vinyl cyclohexene dioxide, of which neopentyl glycol diglycidyl ether is preferred. Monoepoxide diluents include, for example, neodecanoic glycidyl ether, alkyl glycidyl ether, butyl glycidyl ether, cresyl glycidyl ether, glycidyl methacrylate, phenyl glycidyl ether, and olefin oxides, of which neodecanoic glycidyl ether is preferred.

Another class of diluents which may be used according to the invention contains compounds which act not only to reduce viscosity, but which also act as accelerators for the curing reaction. Examples of such diluents include aromatic compounds which possess a hydroxyl functionality, such as nonyl phenol. Especially useful are aromatics with hydroxylated alkyl side chains, such as benzyl alcohol and furfuryl alcohol.

Part A of the epoxy sealer/healer will typically contain diluents in an amount ranging from 45–60% by weight. In a preferred embodiment, Part A contains from 35–45% by weight of a diepoxide diluent, 5–10% by weight of a monoepoxide diluent, and 2–4% by weight of a hydroxylated aromatic diluent.

Part B of the two-component epoxy sealer/healer contains one or more amine curing agents. Examples of amine curing agents include aliphatic primary, secondary and tertiary amines, aromatic amines, cycloaliphatic amines, heterocyclic amines, amido amines and polyether amines. A preferred amine is isophorone diamine.

The curing agent can include an amine which acts as an accelerant, e.g., a compound which contains both tertiary amine and hydroxyl functionalities. A preferred amine-accelerant is 2,4,6,-tri(dimethylaminomethyl)phenol.

Part B of the epoxy sealer/healer may also include one or more accelerants in addition to, or in place of, the amine/accelerant. Suitable as such accelerants are any which contain a hydroxyl functionality. Preferred accelerants are phenol and salicylic acid.

Part B further contains an adduct of a dialkylene triamine such as diethylene triamine, and an alkylene oxide such as ethylene oxide or propylene oxide. Preferred is an adduct of 1 mole of ethylene oxide attached to 1 mole of diethylamine triamine via one of its primary amines.

Part B contains amine curing agents which are in approximately stoichiometric amounts with respect to the amount of epoxy resin in Part A with which Part B will be mixed. Part B can generally contain about 1–3% by weight of dialkylene triamine-alkylene oxide adduct, about 9–18% by weight of amine-accelerant, about 5–18% by weight of accelerants, and about 2–8% by weight of diluent, preferably a hydroxylated aromatic diluent.

For use, Parts A and B of a two-part epoxy sealer/healer according to the invention are mixed such that there is an approximately stoichiometric ratio of epoxy resin to amine curing agent. Accordingly, the weight ratio for mixing of Part A to Part B can range from 10:1 to 1:1. In a preferred embodiment, Parts A and B are mixed at a weight ratio of 2:1 to 3.5:1, and most preferably about 2.5:1.

An advantage of the epoxy sealer/healer according to the invention is that it can be applied by gravity feed. For example, the epoxy sealer can be poured directly onto the cracked concrete surface and, if needed, spread using a roller, broom, squeegee or other applicable device. Enough epoxy sealer/healer should be applied such that all cracks are filled. Large cracks may first be filled with sand or other appropriate filler prior to application of the epoxy sealer/healer.

Though not usually necessary, the epoxy sealer/healer can also be applied by pressure injection. The ability to inject the epoxy sealer/healer with a low pressure is a significant advantage since not all cracks can be filled using gravity. Furthermore, in a complex structure such as a tunnel or bridge-head, the cracks are branching so that use of low pressure injection will have a significant effect. Low pressure injection is preferred because it is easy to install and maintain at low cost. Low pressure injection is generally performed at a pressure of up to about 20 psi, preferably at 10–12 psi. The low viscosity of the epoxy sealer/healer of the invention combined with the toughness of the cured material will allow its use as a repair material in cracked concrete dams and other structures that need structural crack bonding. The epoxy sealer/healer can be injected in those applications.

Controlling viscosity assists in providing a gravity feedable epoxy sealer/healer. For example, the viscosity at 73° F. should be no greater than 100 cps so that the epoxy sealer/healer can penetrate and fill all cracks in the concrete surface. Diluents can be used which compensate for the viscosity of the particular epoxy resin and amine hardener present in Parts A and B, respectively. Furthermore, diluents are used which do not result in a significant deterioration of properties of the cured resin, such as strength and modulus. An advantage of using diluents as described herein is that the addition of surface tension reducers is not necessary to provide the requisite crack penetration.

Generally, the epoxy sealer/healer of the invention will penetrate a concrete crack at a rate of at least 10 mm/min for a crack 0.5 mm wide when applied by gravity feed. Preferably, the gravity feed penetration rate is at least 10 mm/min for a crack 0.1 mm wide, more preferably, at least 75 mm/min for a crack 0.1 mm wide.

Another advantageous feature of epoxy sealer/healer formulations according to the invention is their tack-free time. Tack-free time is the time it takes the mixture of Parts A and B to become dry to the touch. In general, the tack-free time at 73° F. will be no more than 12 hours, usually no more than 8 hours. The invention can even provide a tack-free time of no more than 6 hours, with the most preferred embodiments providing a tack-free time of no more than 4 hours.

The tack-free time is a function not only of the epoxy resin and amine in the sealer/healer, but depends on the amounts and types of diluents added, and accelerators as well. By adding more than one type of accelerator, catalysis occurs by more than one mechanism. This provides the quickest tack-free time. For example, the amine addition reaction is greatly accelerated by the presence of a hydroxyl group or other hydrogen donor, such as phenol, salicylic acid or benzyl alcohol. The hydroxyl group is believed to hydrogen bond with the epoxy oxygen and thereby aid in the formation of a three-membered hydroxyl-epoxy-amine transition state, which subsequently yields the amine-epoxy addition product and hydroxyl group. An additional mechanism by which catalysis occurs is via the use of tertiary amines, such as 2,4,6-tri(dimethylaminomethyl)phenol, which act as Lewis bases. The tertiary amines are thought to provide catalysis by temporarily attaching to one of the carbon atoms of the epoxy group of the resin, thereby facilitating the interaction of the epoxy oxygen with a hydroxyl compound, with subsequent production of an alkoxide ion. The alkoxide ion can then react directly with an available epoxy group to generate a new alkoxide ion.

Another advantageous feature of epoxy sealer/healer formulations according to the invention is the useable working life of those formulations. The working life of an epoxy sealer/healer composition according to the invention is the time after admixture of Parts A and B in which the epoxy sealer/healer can be applied to concrete before gelling of the mixture occurs. An epoxy sealer/healer according to the invention will have a working life of at least 15 minutes at 73° F., preferably as long as 25 minutes, more preferably longer than 25 minutes.

The dialkylene triamine-alkylene oxide adduct used in epoxy sealer/healer formulations according to the invention provides an additional advantageous characteristic of the invention. The adduct prevents reaction of amines with water and carbon dioxide, thus preventing formation of compounds detrimental to good bond formation. As a result, an epoxy sealer/healer formulation according to the invention can cure and provide adhesion even to moist/water saturated concrete. The terminal hydroxyl of the alkylene oxide moiety also aids in providing a bond to the concrete. Thus, the epoxy sealer/healer can heal concrete cracks to a strength as great as that of uncracked concrete. The cured sealer/healer can achieve a modulus of at least 250,000 psi and a compressive strength of at least 13,000 psi.

The addition of fillers to the epoxy sealer/healer is not required. Generally, the addition of fillers should be avoided since they will result in an increase in the viscosity of the epoxy sealer/healer.

The following example provides an illustration of the invention. The example, however, should not be construed as limiting the invention in any way.

EXAMPLE 1

A two-part epoxy sealer/healer formulation was prepared. Part A and Part B were formulated as follows:

| Component | % by weight |
| --- | --- |
| PART A | |
| Araldite 6005* (epoxy resin) | 48 |
| Neopentyl glycol diglycidyl ether | 41 |
| Neodecanoic glycidyl ether | 7.5 |

-continued

| Component | % by weight |
| --- | --- |
| Furfuryl alcohol | 3.5 |
| PART B | |
| Isophorone diamine | 69.5 |
| 2,4,6-Tri(dimethylaminomethyl)phenol | 14.1 |
| Phenol | 6.3 |
| Benzyl alcohol | 4.5 |
| Salicylic acid | 3.5 |
| 1:1 Adduct of diethylene triamine and ethylene oxide | 1.8 |
| Diethylene triamine | 0.3 |

*Araldite 6005 is a product of Ciba-Geigy Corporation.

Part A and Part B are mixed in a ratio of 2.9:1 by weight, which corresponds to a ratio of 2.5:1 by volume. The cured product had a tack-free time of 6 hours and possessed the following characteristics:

| | Cure and Test Temperature | | |
| --- | --- | --- | --- |
| | 40° F. | 60° F. | 73° F. |
| Gel Time, 100 gms., minutes | | | 25 |
| Viscosity, Brookfield, cps | | | |
| Component "A" | | | 95 |
| Component "B" | | | 68 |
| Heat Deflection Temp., ° F. (ASTM D648) | | | 118 |
| Tg, ° F. | | | 124 |
| Water Absorption, % (ASTM D570) 24 hour immersion | | | 0.61 |
| Hardness, Shore D | | | 84 |
| Flexural Strength, psi | | | 9500 |
| Flexural Modulus, psi × 10⁻⁵ (ASTM D790) | | | 4.83 |
| Tensile Strength, psi | | 4000 | 7500 |
| Tensile Elongation, % (ASTM D638) | | 1.6 | 2.3 |
| Shear Strength (punch), psi (ASTM D732) | | | 7600 |
| Linear Shrinkage, in/in (ASTM D 2566) | | | <0.001 |
| Abrasion Resistance, Taber, gms. lost 1000 gms, 1000 cycles Wheel # CS 17 | | | 0.147 |
| Dyna-Pull, psi | | | 540 |
| Compressive Strength, psi (ASTM D695) | | | |
| 16 hrs. cure | | | 500 |
| 1 day cure | | 255 | 5150 |
| 3 days cure | 1200 | 11600 | 12975 |
| 7 days cure | 7900 | 13750 | 14825 |
| 14 days cure | 12600 | | 15350 |
| 28 days cure | 12600 | | 15850 |
| Compressive modulus, psi × 10⁻⁵ | | | 3.69 |
| Bond Strength (ASTM C882), psi Hardened Concrete to Hardened Concrete | | | |
| 2 days (moist cure) | | | 1430 |
| 14 days (moist cure) | | | 2700 |
| Hardened Concrete to Steel | | | |
| 2 days (moist cure) | | | 1880 |
| 14 days (moist cure) | | | 2050 |

Except where noted, cure time = 7 days

Although preferred embodiments of the invention have been described above, it will be appreciated that many modifications and variations of the present invention are possible in light of the above teachings and within the purview of the appended claims without departing from the spirit and intended scope of the invention.

We claim:

1. An epoxy sealer/healer formulation for sealing and strengthening cracked concrete comprising an epoxy resin, an amine and a dialkylene triamine-alkylene oxide adduct, said formulation providing a modulus and/or compressive strength at least that of uncracked concrete and effective for penetrating a concrete crack at a rate of at least 10 mm/min for a crack 0.5 mm wide when applied by gravity feed.

2. An epoxy sealer/healer according to claim 1 which has a tack-free time of 6 hours or less at 73° F.

3. An epoxy sealer/healer according to claim 1 which has a viscosity of 100 cps or less at 73° F.

4. An epoxy sealer/healer according to claim 1 which has a working life of 25 minutes or longer for 100 gms at 73° F.

5. An epoxy sealer/healer according to claim 1 which comprises one or more diluents.

6. An epoxy sealer/healer according to claim 5 wherein the diluent is a diepoxide.

7. An epoxy sealer/healer according to claim 5 wherein the diluent is a monoepoxide.

8. An epoxy sealer/healer according to claim 5 wherein the diluent is a non-reactive diluent.

9. An epoxy sealer/healer according to claim 1 which comprises one or more accelerants.

10. An epoxy sealer/healer according to claim 9 wherein the accelerant is phenol.

11. An epoxy sealer/healer according to claim 9 wherein the accelerant is furfuryl alcohol.

12. An epoxy sealer/healer according to claim 1 wherein the epoxy resin is a bisphenol A-epichlorohydrin resin.

13. An epoxy sealer/healer according to claim 1 wherein the amine is a cycloaliphatic amine.

14. An epoxy sealer/healer according to claim 1 which bonds to the inner surface of a concrete crack.

15. An epoxy sealer/healer for sealing and strengthening cracked concrete comprising a wet surface-bonding, concrete crack self-penetrating formulation comprising an epoxy resin and amine, said formulation having a tack-free time of 12 hours or less at 73° F.

16. An epoxy sealer/healer according to claim 15 which comprises one or more dialkylene triamine-alkylene oxide adducts.

17. An epoxy sealer/healer according to claim 15 which has a viscosity of 100 cps or less at 73° F.

18. An epoxy sealer/healer according to claim 15 which restores the strength of cracked concrete to at least that of uncracked concrete.

19. An epoxy sealer/healer for sealing and strengthening cracked concrete comprising a wet surface-bonding, concrete crack self-penetrating formulation comprising an epoxy resin, an amine and an dialkylene triamine-alkylene oxide adduct, said formulation having a tack-free time of 6 hours or less at 73° F. and a viscosity of 100 cps or less at 73° F.

* * * * *